(12) United States Patent
Liao

(10) Patent No.: US 7,508,584 B2
(45) Date of Patent: Mar. 24, 2009

(54) TELESCOPE WITH INVARIABLE DISPLAY OF DIGITAL DATA

(75) Inventor: Chen-cheng Liao, TaiChung (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 11/555,531

(22) Filed: Nov. 1, 2006

(65) Prior Publication Data

US 2007/0097499 A1    May 3, 2007

(30) Foreign Application Priority Data

Nov. 2, 2005    (TW) .............................. 94138404 A

(51) Int. Cl.
*G02B 23/00* (2006.01)
*G02B 27/10* (2006.01)
(52) U.S. Cl. .................. 359/419; 359/399; 359/618
(58) Field of Classification Search ......... 359/399–432, 359/618, 629–630
See application file for complete search history.

(56) References Cited

U.S. PATENT DOCUMENTS 5,579,165 A * 11/1996 Michel et al. ............... 359/630
5,963,369 A * 10/1999 Steinthal et al. ............. 359/410
6,717,739 B2    4/2004 Zimmer et al.
2005/0219690 A1* 10/2005 Lin et al. .................... 359/429

FOREIGN PATENT DOCUMENTS

| CN | 2519298 | 10/2002 |
|----|---------|---------|
| TW | 84876   | 2/1987  |
| TW | 595851  | 6/2004  |

* cited by examiner

*Primary Examiner*—Thong Nguyen

(57) ABSTRACT

A telescope includes an objective lens to receive an optical signal from an object and an electronic signal generator that generates an electronic signal representing for example distance and direction of the object. Both signals travel through a magnification system to from images on a viewer side image plane. The image representing the electronic signal is further transmitted, before reaching the image plane, through a reflector prism, by which the image of the electronic signal is maintained invariable with respect to the variation of magnification factor of the telescope.

5 Claims, 3 Drawing Sheets

TELESCOPE WITH INVARIABLE DISPLAY OF DIGITAL DATA

BACKGROUND OF THE INVENTION

1. Field of the Invention

The present invention relates to a telescope that displays both an image of an object and a digital reading to an observer, and in particular to a telescope that displays the digital reading in an invariable manner.

2. Description of the Prior Art

A conventional telescope is used to observe an object by forming an image of the object through optical elements that focus the image in front of an ocular system. Example of the optical elements include a right-angle prism, a roof prism, and a Porro prism that focuses the image on an image plane in front of the ocular system. The observer can see the image of object. However, most of the telescopes are modified to add an electronic signal generation system that provides an electronic signal carrying digital data, such as distance and direction of the object that is observed with the telescope. The electronic signal is also processed by optical elements to form an image on the image plane to be read by the user of the telescope. Thus, the user can simultaneously see the images of both the object and the electronic signal through the ocular system.

However, some telescopes are of adjustable magnification, and thus the telescopes include a magnification lens group that is arranged between the image plane and the ocular system for adjusting the magnification of the image of the object. The image of the electronic signal is usually focused on the image plane in front of the magnification lens group and is thus subject to the magnification caused by the magnification lens group. This makes the size of the image of the electronic signal varies and thus imposing an underside limitation to the magnification the object image. Further, brightness of the electronic signal changes with the adjustment of magnification factor, which causes undesired effect to the observer's eyes and digital control of the system.

Hence, a telescope is required to overcome the above-mentioned disadvantages of the prior art.

BRIEF SUMMARY OF THE INVENTION

Therefore, an objective of the present invention is to provide an improved telescope in order to overcome the aforesaid drawbacks associated with the prior art.

According to the present invention, there is provided a telescope comprising a first image plane, a second image plane, a magnification lens group for adjusting magnification of the telescope, and a digital supply oscillator that generates an electronic signal carrying digital information. A reflector prism is set between the second image plane and the magnification lens group. The signal emitted from the digital supply oscillator focuses on the second image plane through the reflector prism. The telescope in accordance with the present invention is additionally provided with the reflector prism arranged between the second image plane and the magnification lens group to make the size and brightness of the image associated with the electronic signal invariable and thus enhancing observation and control of the electronic signal.

The advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE PREFERRED EMBODIEMNT

Reference will now be made in detail to preferred embodiment of the present invention.

Figure 1:
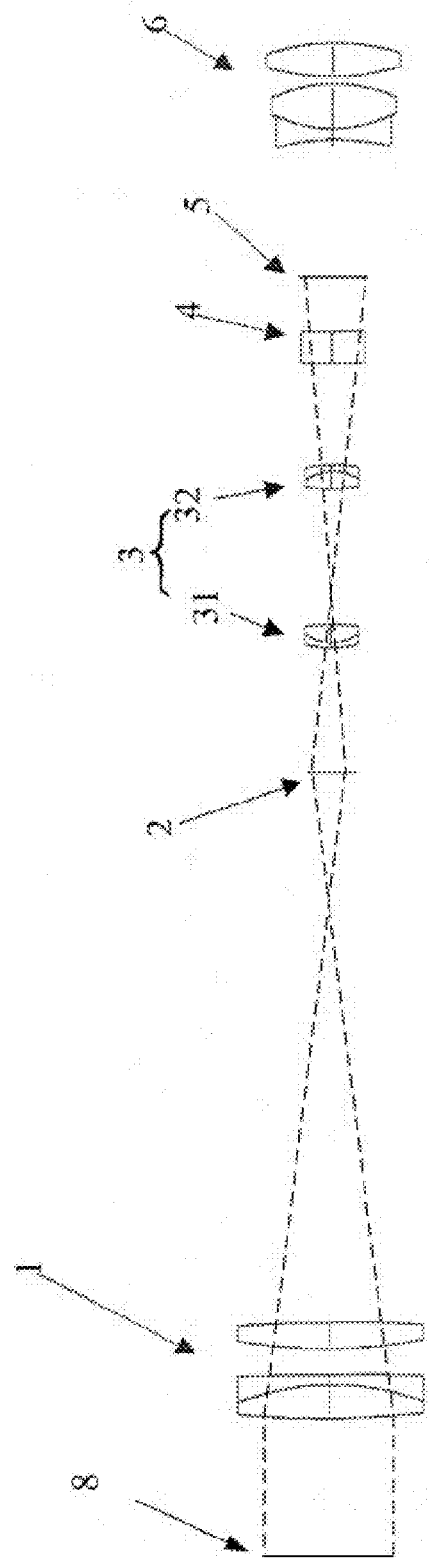
FIG. 1 shows an optical system of a telescope according to the invention.

Referring to FIG. 1, a telescope according to the invention comprises objective lens 1, a first image plane 2, a magnification lens group 3, a reflector prism 4, a second image plane 5, and an ocular lens 6. The telescope captures an object 8 through the objective lens 1 and the image of the object 8 is focused on the first image plane 2. The magnification lens group 3 comprises at least two optical lenses 31 and 32. The image formed on the first image plane 2 passes through the magnification lens group 3 and is then focused on the second image plane 5, whereby a user can see the image enlarged or reduced through the ocular lens 6.

In the embodiment illustrated, the magnification lens group 3 and the objective lens 1 together define an optical axis of the telescope. However, in other embodiments, other arrangements that form an image of an object in a user's eyes through an objective lens and a magnification lens group can be employed without departing from the spirit of the invention.

Figure 2:
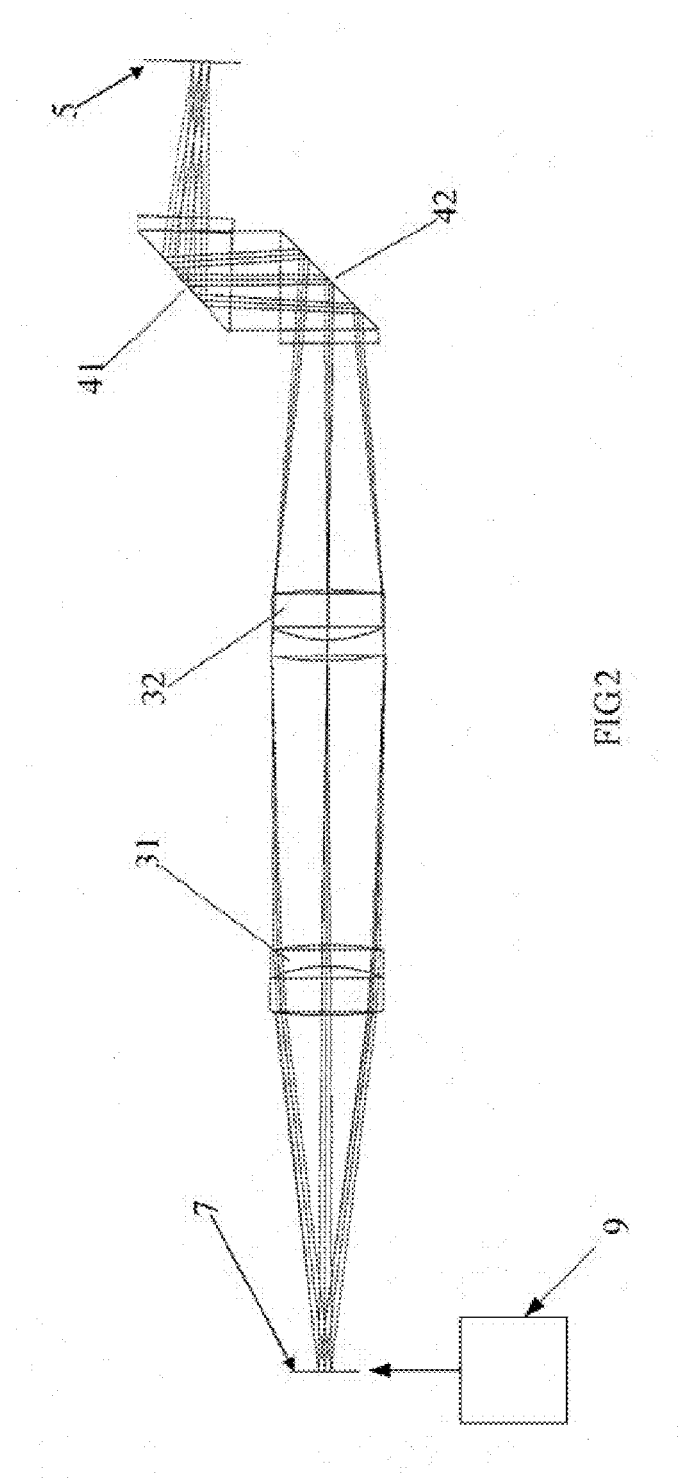
FIG. 2 shows an optical pass between a digital supply oscillator and a second image plane of the telescope according to the invention.

Also referring to FIG. 2, the telescope comprises a digital supply oscillator 9, which generates and supplies an electronic signal 7 to be displayed on second image plane 5 and thus read by the telescope user. The electronic signal 7 includes information that is useful to the telescope use and is shown up together with the image of the object 8 that is observed by the user with the telescope. Examples of the electronic signal 7 include direction and distance of an object observed. The digital supply oscillator 9 is located at a position offsetting from the optical axis of the telescope. The electronic signal 7 emitted from the digital supply oscillator 9 transmits through the optical lenses 31 and 32 of the magnification lens group 3 and then gets incident on the reflector prism 4.

The reflector prism 4 has a substantially rhombic outline in side views, and is comprised of upper and lower lenses right-triangle lenses superimposed on each other, each having a hypotenuse and two legs perpendicular to each other. In the embodiment illustrated, the optical axis of telescope is substantially horizontal in the sheets of the drawings, and the reflector prism 4 is arranged in such a way that the hypotenuse 42 of the lower right-triangle lens extends in a 45-degree direction with respect to the horizontal line (namely optical axis), and thus forming a total reflection surface 42. In other embodiments, the angle between the hypotenuse 42 of the lower lens and the horizontal line can be adjusted according to the wavelength of the electronic signal 7 and/or the material of the lower lens in order to effect total reflection at the hypotenuse 42.

The upper right-triangle lens is set in an opposite direction, with respect to the lower lens 42, and the hypotenuse 41 of the upper lens is opposite to that of the lower lens 42. The hypotenuse 41 of the upper lens is preferred a film-coated surface. As the incidence angles that the light gets incident to the second image plane 5 and the height of the image formed on the image plane 5 are different (the different lights shown in FIG. 2), the inclination angle of the film-coated surface 41 of the upper lens must be varied according to the position of the image; otherwise the user will see overlapped images. Since, for regular telescopes, the incidence angle that the highest image incident to the second image plane 5 is in the range between 5-7.5 degrees, the angle the surface 41 needs to deviate from the 45-degree line by an angle between −4 degrees and +4 degrees according to the different expectation position of the electronic signal 7 that is imaged in field of vision.

Figure 3:
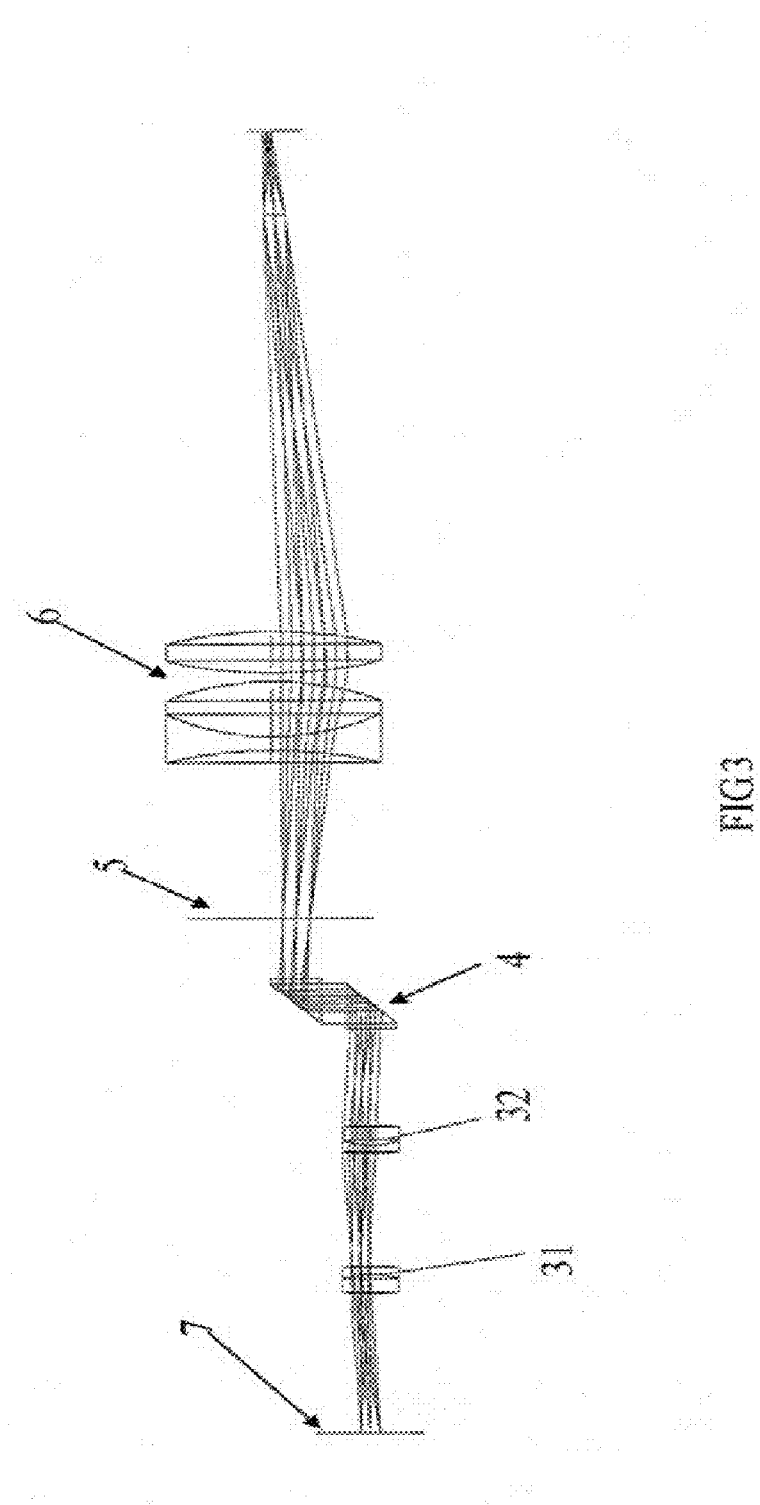
FIG. 3 shows an entire optical pass between the digital supply oscillator and an ocular system of the telescope according to the invention.

Referring to FIG. 3, which shows the entire optical pass between the digital supply oscillator 9 and the ocular system, the electronic signal 7 passes through the optical lens 31, 32 first, and then is reflected by the total reflection surface 42 and the film-coated surface 41 of the reflector prism 4, forming an image on the second image plane 5, whereby the user can see the image of the electronic signal 7 through the ocular lens 6.

Due to the adjustment imposed on the electronic signal 7 by the reflector prism 4, the image of the electronic signal 7 maintains invariable, that is having a fixed size, on the second image plane 5 no matter what magnification factor is taken by the magnification lens system 3. This is helpful for the user to read the digital information carried by the electronic signal 7 displayed on the second image plane 5.

It is to be understood, however, that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A telescope comprising:
   a magnification lens group that receives and magnifies an optical signal from an object with a selected magnification factor to form a first image of the object on an image plane;
   an electronic signal generator that generates and supplies an electronic signal carrying a digital information, the electronic signal emits through the magnification lens group; and
   a reflector prism arranged between the image plane and the magnification lens group, whereby the electronic signal emitted from the electronic signal generator travels through the reflector prism to form a second image of the electronic signal on the image plane.

2. The telescope as claimed in claim 1, wherein the reflector prism comprises a total reflection surface and a film-coated surface opposite to each other in a travel path of the electronic signal.

3. The telescope as claimed in claim 2, wherein the second image is first reflected by the total reflection surface and then reflected by the film-coated surface to focus on the image plane.

4. The telescope as claimed in claim 2, wherein the total reflection surface is set an angle with respect to an optical axis of the electronic signal that induces total reflection of the electronic signal.

5. The telescope as claimed in claim 2, wherein the film-coated surface is set at an angle with respect to an optical axis of the electronic signal to focus the second image at a desired position on the image plane.

* * * * *